United States Patent
Dutson

(10) Patent No.: US 8,500,593 B2
(45) Date of Patent: Aug. 6, 2013

(54) TWIN VARIATOR TRANSMISSION ARRANGEMENT

(75) Inventor: Brian J. Dutson, Astley (GB)

(73) Assignee: Torotrak (Development) Limited, Lancashire (GB)

( * ) Notice: Subject to any disclaimer, the term of this patent is extended or adjusted under 35 U.S.C. 154(b) by 651 days.

(21) Appl. No.: 12/523,718

(22) PCT Filed: Jan. 16, 2008

(86) PCT No.: PCT/JP2008/050030
§ 371 (c)(1),
(2), (4) Date: Feb. 19, 2010

(87) PCT Pub. No.: WO2008/087450
PCT Pub. Date: Jul. 24, 2008

(65) Prior Publication Data
US 2010/0248887 A1    Sep. 30, 2010

(30) Foreign Application Priority Data
Jan. 19, 2007    (GB) .................................. 0701057.2

(51) Int. Cl.
*F16H 37/02*    (2006.01)
(52) U.S. Cl.
USPC ........................................................ 475/216
(58) Field of Classification Search
USPC .... 475/214, 215, 216, 217, 218, 219; 476/31, 476/32
See application file for complete search history.

(56) References Cited

U.S. PATENT DOCUMENTS

| | | | |
|---|---|---|---|
| 4,297,918 A | 11/1981 | Perry | 476/10 |
| 4,922,788 A * | 5/1990 | Greenwood | 475/26 |
| 5,967,931 A * | 10/1999 | Hoge et al. | 475/216 |
| 6,213,907 B1 * | 4/2001 | Wooden | 475/216 |

(Continued)

FOREIGN PATENT DOCUMENTS

| | | |
|---|---|---|
| DE | 101 24 838 | 12/2002 |
| DE | 10124838 A1 * | 12/2002 |
| FR | 1 464 924 | 11/1966 |
| GB | 2274315 A * | 7/1994 |

OTHER PUBLICATIONS

English translation of DE10124838A1, Jun. 30, 2012, http://translationportal.epo.org.*

(Continued)

*Primary Examiner* — Roger Pang
(74) *Attorney, Agent, or Firm* — Fulbright & Jaworski LLP

(57) ABSTRACT

A transmission arrangement is disclosed which comprises first and second variators (166, 169) each of which comprises an input race (150, 154) and an output race (152, 156). A plurality of rollers (276, 278) is arranged to run upon the input and output races to transfer drive from one to the other. The races are mounted for rotation about a common axis and the inclination of the first variator's rollers is variable independently of the inclination of the second variator's rollers, so that the two rollers are able to provide independently and continuously variable drive ratios. To provide traction between the rollers and races, a biasing device (216, 217) applies an axial force to one of the races, urging the rollers and races into engagement with each other. Each variator is provided with a shunt gear for providing forward, reverse and geared neutral ratios, and to couple the variator input to the shunt gear a coupling member (160) passes through the outer variator races.

20 Claims, 5 Drawing Sheets

U.S. PATENT DOCUMENTS

| | | | |
|---|---|---|---|
| 6,705,964 B2* | 3/2004 | Nagai et al. | 475/216 |
| 6,931,316 B2* | 8/2005 | Joe et al. | 701/61 |
| 2002/0058562 A1* | 5/2002 | Ishikawa et al. | 475/216 |
| 2003/0100400 A1 | 5/2003 | Kawai et al. | 476/40 |
| 2003/0125154 A1 | 7/2003 | Miyata et al. | 475/208 |
| 2005/0164820 A1* | 7/2005 | Miyata et al. | 475/215 |
| 2008/0153659 A1* | 6/2008 | Greenwood | 476/42 |

OTHER PUBLICATIONS

International Preliminary Report on Patentability issued in PCT Application PCT/GB2008/050030 on Jul. 21, 2009.

International Search Report issued in PCT Application PCT/GB2008/050030 on Jul. 18, 2008.

* cited by examiner

TWIN VARIATOR TRANSMISSION ARRANGEMENT

CROSS REFERENCE(S) TO RELATED APPLICATION(S)

This application is a national phase application under 35 U.S.C. §371 of International Application No. PCT/GB2008/050030 filed Jan. 16, 2008, which claims priority to Great Britain Application No. 0701057.2 filed Jan. 19, 2007, both of which are incorporated by reference without disclaimer.

The present invention is concerned with continuously variable transmissions, and in particular with the type of arrangement in which two ratio varying units ("variators") are used to provide two independently variable output speeds.

Such arrangements are particularly, but not exclusively, applicable in connection with vehicles which are steered by controlling the relative speeds of driven wheels on their opposite sides. Track-laying vehicles such as tanks are of course steered in this way (note in this regard that although, for the sake of brevity, reference will be made throughout to vehicle "wheels", this should be understood to encompass vehicles of track-laying type, wherein the "wheels" in question are pinions on which the tracks are carried) but so too are various types of vehicle used in construction, agriculture and horticulture, including for example ride-on lawnmowers. The principle is simple. If the wheel on one side of the vehicle is driven faster than the wheel on the other side, then the vehicle turns, with the slower moving wheel being on the inside of the turn. The wheel on the inside of the turn may be stationary, or may even be driven in the opposite direction to the other wheel. In the extreme case where the two wheels are driven at equal and opposite speeds, the vehicle can be caused to spin about its centre, a manoeuvre referred to as a "zero turn".

One way to achieve the necessary control over the speed and direction of rotation of the driven vehicle wheels involves the use of one engine but two essentially independent continuously variable transmissions ("CVTs") through which the engine drives the left and right hand vehicle wheels respectively. In the case of small horticultural vehicles such as ride-on lawnmowers, CVTs based upon variators of hydrostatic type have been used in this role.

Prior European patent application 88308025.1, filed by Torotrak (Development) Limited and published under no. EP0306272, discloses a transmission arrangement intended for driving and steering a tracked vehicle which uses two variators of rolling traction type integrated into a single unit, the variator's semi-toroidally recessed races all being mounted upon a common shaft. The type of variator in question is well known in the art and comprises rollers which transfer drive between the aforesaid races, the rollers being able to tilt to vary the relative speeds of the races and so vary the variator's drive ratio.

It is a common practice for a CVT to incorporate, in addition to the variator itself, a "shunt" gear train, typically of epicyclic type. The shunt gear train receives as inputs (a) the input speed to the variator and (b) the output speed of the variator. Its output is a speed which is a function of its inputs, and typically a summation of them. This is particularly useful in the present context, since such a shunt makes it is possible to move from forward rotation of the output, through a static condition referred to as "geared neutral", to reverse rotation, merely by adjustment of the variator ratio. In the geared neutral state, one input to the shunt cancels out the other and the output is static despite being coupled to the moving inputs. In principle, therefore, a twin variator, twin shunt transmission can be made to carry out maneuvers such as the zero turn merely through adjustment of the variator ratios, without need of forward/reverse clutches etc. EP88308025.1 shows in schematic form an arrangement incorporating shunt gearing.

Practical implementation of a transmission of this type is problematic. The shunt gear is preferably coaxial with the variators. That is, its major components preferably lie on and rotate about the common axis of the variator races. In this type of arrangement it is not straightforward to supply the shunt gear with both of the inputs it requires. EP88308025.1 shows a somewhat complex arrangement using "bell shaped members" to take off the output speeds from the variator races, to supply these to the shunts, but these members must lie one within another, and be large enough to pass around the variators' input races, creating real practical difficulties.

Published German patent application DE10124838 (Spoettl) shows a twin variator arrangement with a pair of shunt epicyclic gears on opposite sides of a twin variator arrangement.

In order to provide traction between the rollers and the races of the variator, the races need to be biased into engagement with the rollers. It is desirable to provide for this in a manner which is simple in construction and which minimises frictional losses in any thrust bearings through which the biasing force is reacted.

In accordance with a first aspect of the present invention there is a transmission arrangement comprising two variators each of which comprises a first race, a second race, and a plurality of rollers arranged to run upon the first and second races to transfer drive from one to the other, all of the races being mounted for rotation about a common axis with the first races arranged between the second races, the inclination of one variator's rollers being variable independently of the inclination of the other variator's rollers so that the two variators provide independently and continuously variable drive ratios, the arrangement further comprising a biasing device for exerting a force upon at least one of the races to urge the races into engagement with the rollers, and a shaft, lying along the common axis, which passes through the first races and by means of which the second races are coupled, via at least one thrust bearing, to resist movement of one away from the other so that the force of the biasing device is referred through the shaft and the thrust bearing, the arrangement still further comprising two shunt gear trains which are coupled to the respective variators and are coaxial with the variator's races, each shunt gear train having a first gear operatively coupled to the first race of its associated variator, a second gear operatively coupled to the second race of its associated variator, and an output gear whose speed is a function of the speeds of the first and second gears.

The force of the biasing force serves to provide traction between the rollers and the races. The shaft, acting in tension, serves to react the said force from one outer race to the other, without the need for this force to be reacted to the transmission's casing. The thrust bearing accommodates relative rotation of the second races, but the speed of this relative rotation is typically small and frictional losses in the thrust bearing are correspondingly small.

The coupling of the first race to the first gear is preferably made through a coupling member which rotates about the common axis and extends through the associated second race. The coupling member may in particular take the form of a sleeve arranged around, and rotatable relative to, the shaft.

The term "thrust bearing" is used herein to refer to any bearing which is able to refer axial force from one bearing part to another, while permitting relative rotation of the bearing parts. It could in principle be in tension or in compression, although it is preferably in compression.

In a preferred embodiment the shunt gear trains are outboard, and on opposite sides of, the variator races. This is an easy arrangement to package, since the output gears are themselves outboard of the variators and so easy to connect to. The first races may be separate components, or may be formed as a single part with oppositely facing race surfaces.

In such an embodiment the first races preferably serve as the variator's inputs, being coupled to one another to rotate together and provided with a drive arrangement for coupling to a rotary driver. The term "rotary driver" is used to refer to any source of rotary motive power such as an engine, motor etc. The drive arrangement may for example comprise a pulley mounted for rotation about the common axis to be driven by a belt, or a gear mounted for rotation about the common axis to be driven by a chain or another gear.

In the preferred embodiment the biasing device comprises a pre-stressed spring. However it is known in the art to use hydraulic devices for this purpose, so that the force exerted by the biasing device can be altered in sympathy with torque handled by the variator, and such devices may be used in the present invention in place of the spring.

The sleeve preferably passes through all of the variator races, projecting at either end of the variator arrangement to receive the first gears. The first races are preferably mounted upon the sleeve to rotate along with it. In such an embodiment the second races are preferably mounted upon the sleeve through bearings to enable them to rotate independently of it.

The shunt gear trains are preferably of epicyclic type, having a sun gear, a planet carrier carrying planet gears which mesh with the sun gear, and an output gear which meshes with the planet gears. The planet carrier is preferably directly coupled to an outermost face of the second race to rotate with it. In this case the sun is preferably mounted on the aforementioned sleeve.

The two variators may be essentially separate devices, but they may in principle be formed as a single unit having the aforementioned parts.

In accordance with a second aspect of the present invention, there is a transmission arrangement comprising two variators each of which comprises a first race, a second race, and a plurality of rollers arranged to run upon the first and second races to transfer drive from one to the other, all of the r aces being mounted for rotation about a common axis and the inclination of one variator's rollers being variable independently of the inclination of the other variator's rollers, so that the two variators provide independently and continuously variable drive ratios, the arrangement further comprising two shunt gear trains which are coupled to respective variators and are coaxial with the variator's races, each shunt gear train having a first gear operatively coupled to the first race of its associated variator, a second gear operatively coupled to the second race of its associated variator, and an output gear whose speed is a function of the speeds of the first and second gears, the arrangement being characterised in that the operative coupling of the first race to the first gear is made via a coupling member which rotates about the common axis and which passes through the second race.

Specific embodiments of the present invention will now be described, by way of example only, with reference to the accompanying drawings, in which:—

Figure 1:
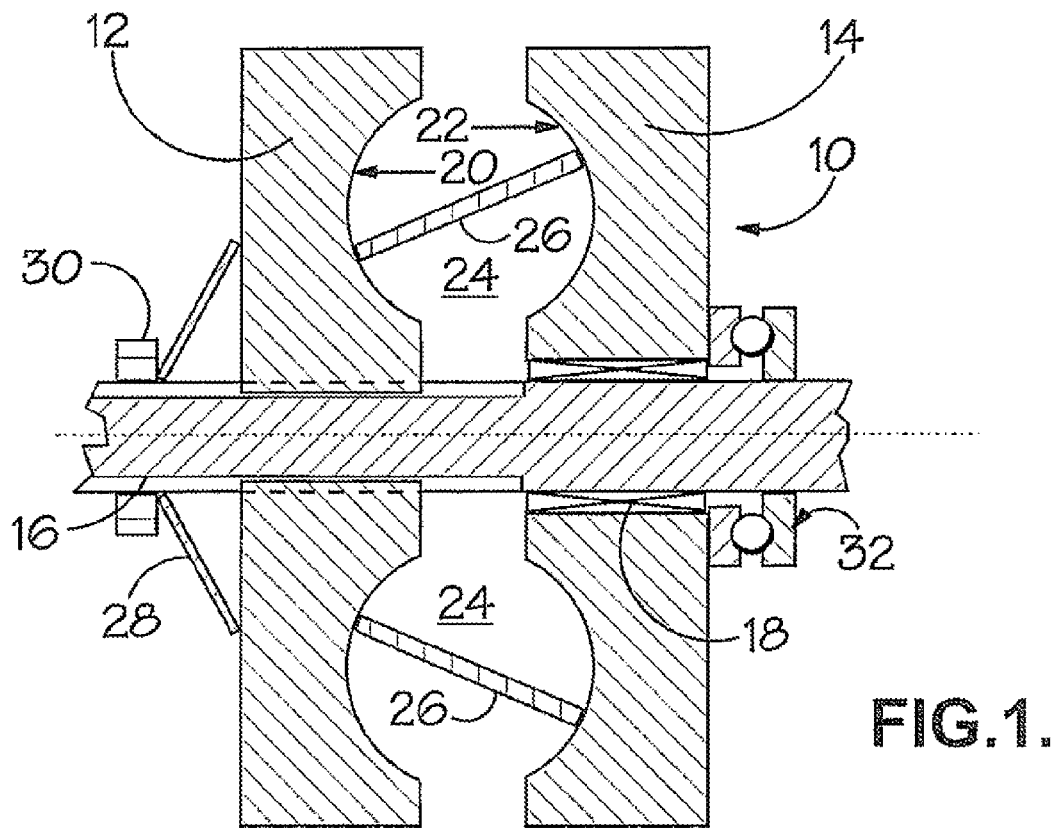
FIG. 1 is a schematic drawing of a toroidal-race, rolling-traction type variator of a type known in the art.

FIG. 1 is a highly simplified representation of some major components of a single toroidal-race rolling traction type variator 10. Such variators are well known in the art and this example does not embody the present invention—it is presented here merely to illustrate certain relevant principles. Input and output races 12, 14 are mounted for rotation about a common axis defined by a shaft 16. The input race 12 is coupled to a rotary driver such as an engine. More specifically, the input race 12 is mounted upon the shaft 16 through splines, which prevent relative rotation while accommodating some movement of the input race along the shaft. The shaft 16 is driven from the engine through gearing (not shown). The output race 14 is mounted upon the shaft 16 through a bearing 18. Opposed faces 20, 22 of the respective races 12, 14 have part toroidal recesses and together define a generally toroidal cavity 24 containing a set of rollers 26. Each roller runs on the recessed faces of both races to transfer drive from one to the other. The roller's mountings (not illustrated in this highly simplified drawing) allow them to move to change their inclination to the common axis and in this way the speed of one race relative to the other—i.e. the variator's drive ratio—is continuously varied.

To provide traction between the rollers 26 and the races 12, 14, these parts must be biased toward each other. In the illustrated example a pre-stressed conical spring 28 (commonly referred to as a Belleville washer) is trapped between the input race 12 and a collar 30 secured to the shaft 16, and so urges the input race 12 toward the output race 14. Its force, transmitted through the rollers 26 to the output race 14, is reacted to the shaft 16 through a thrust bearing 32 which engages with the outer face of the output race 14. The shaft is thus in tension.

The biasing force carried by the thrust bearing 32 is considerable. The shaft 16 and the output race 14 rotate in opposite directions, so that the thrust bearing's two bearing races rotate at high speed relative to each other. Significant energy losses are created in the thrust bearing 32 as a result.

Figure 2:
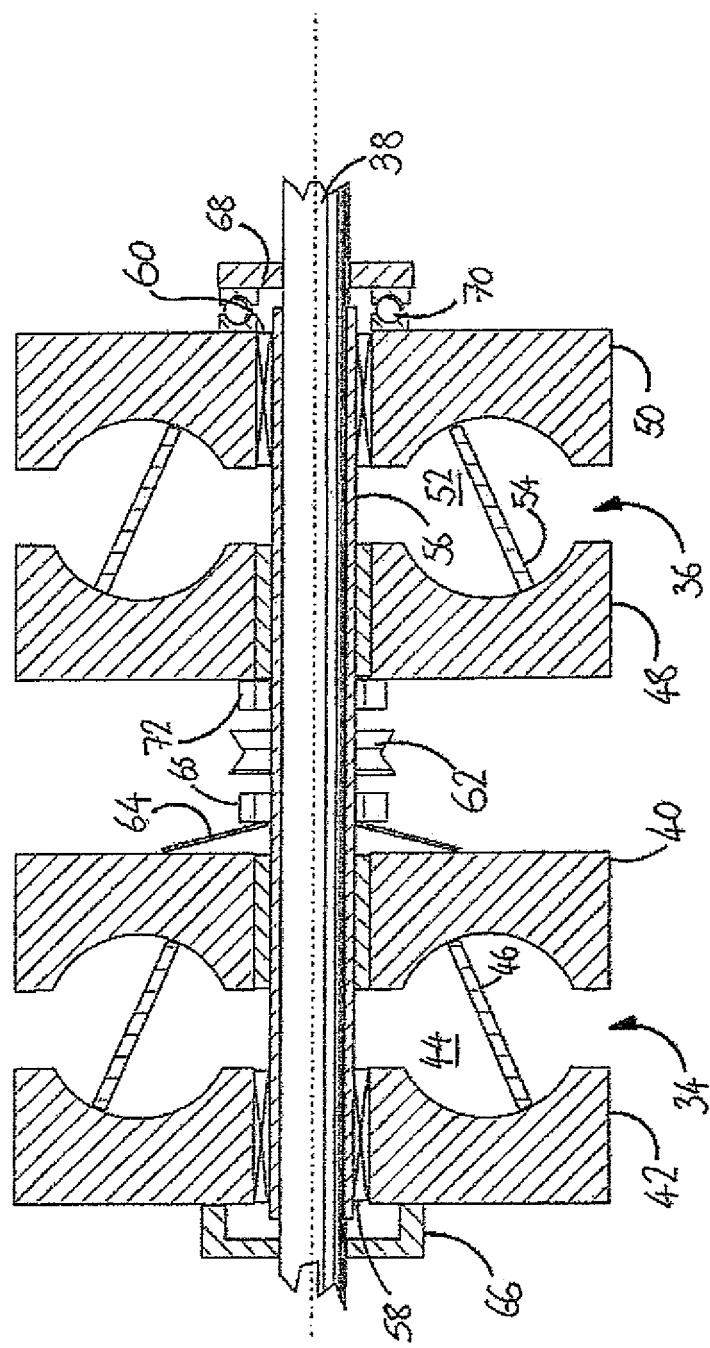
FIG. 2 is a schematic drawing of a twin variator arrangement embodying certain features of the present invention.

FIG. 2 is a highly simplified representation of a twin variator transmission arrangement, which again serves to illustrate certain principles relevant to the present invention. It has first and second variators 34, 36 which are driven from a common input but have independently variable output speeds. The two variators are coupled together—they may in fact be formed as a single unit—and their races are mounted for rotation about a common axis defined by a shaft 38.

The first variator 34 has a first input race 40 and a first output race 42 having facing semi-toroidally recessed surfaces which together define a first generally toroidal cavity 44 containing a first set of rollers 46 to transfer drive between the first races at continuously variable ratio. The second variator 36 has a second input race 48 and a second output race 50 having facing semi-toroidally recessed surfaces which together define a second generally toroidal cavity 52 containing a second set of rollers 54 to transfer drive between the second races at continuously variable ratio. The input races 40, 48 are between the output races 42, 50 and are "back-to-back"—that is, their recessed surfaces face outwardly, away form one another. They are coupled through a sleeve 56 which lies around—and is coaxial with—the shaft 38. The sleeve 56 is able to rotate independently of the shaft 38. The first and second input races 40, 48 are mounted upon the sleeve to rotate along with it, but are capable of some movement along the axial direction, e.g. by virtue of a splined mounting on the sleeve. The first and second output races 42, 50 are respectively mounted on the sleeve through first and second bearings 58, 60 and so can rotate independently of it.

In the illustrated example a pulley 62 is fixedly mounted on the sleeve 56 between the first and second input races 40, 48, and a belt (not illustrated) running on this pulley serves to transfer drive from an engine, motor or other prime mover to the input races. Of course other means could be used to transfer drive, such as a chain and gear, or indeed a g ear arrangement as such. Being coupled together by the sleeve 56, the two input races 40, 48 run at identical speed, which will be referred to as the input speed. The speeds of the first and second output races 42, 50, which will be referred to as the first and second output speeds, are able to vary independently, in accordance with the ratios of the first and second variators 34, 36. Thus by coupling the output races 42, 50 to driven wheels on opposite sides of a motor vehicle, the steering effect referred to above can be achieved.

A biasing device is once more needed to provide traction between the rollers 46, 54 and the races 40, 42, 48, 50. In the FIG. 2 arrangement this takes the form of a pre-stressed spring 64, which is of conical type. The spring acts on the first input race 40, urging it away from the second input race 48. If the races were unrestrained, the biasing force would simply move them apart and traction would be lost. This is prevented by virtue of the shaft 38, which is placed in tension and which prevents the output races from moving apart. To explain this in more detail, note that the spring 64, acting against a first stop collar 65 mounted on the sleeve 56, urges the first input and output races 40, 42 outwards, away from the second variator 36, but this force is reacted to the shaft 38 through a first end collar 66 which is axially fixed upon the shaft 38, outboard of the first output race 42. The force thus exerted on the shaft is reacted though a second end collar 68 outboard of the second output race 50 and via a thrust bearing 70 to the second input and output races 48, 50. A second stop collar 72 serves to react the force back to the sleeve, whose central portion is thus in compression. The thrust bearing 70 enables relative rotation of the first and second output races 42 and 50, which of course is necessary since their speeds will not in general be the same. Note that in this arrangement the shaft 38 does not serve to transmit torque to any of the variator races, its main role instead being to carry the biasing force.

The FIG. 2 arrangement requires only a single thrust bearing 70 for its two variators, which is attractive from the point of view of simplicity and economy. Perhaps more importantly, it serves to minimise energy losses in the thrust bearing because rotation of one side of the thrust bearing relative to the other is typically small—and sometimes zero. Where the arrangement is used, as discussed above, to drive left and right hand wheels of a vehicle, the output races 42, 50 (coupled to respective vehicle wheels) will for much of the time run at similar speeds. While the vehicle is driven in a straight line, their speeds are the same and there is no rotation of one side of the thrust bearing relative to the other and hence no frictional loss.

Figure 3:
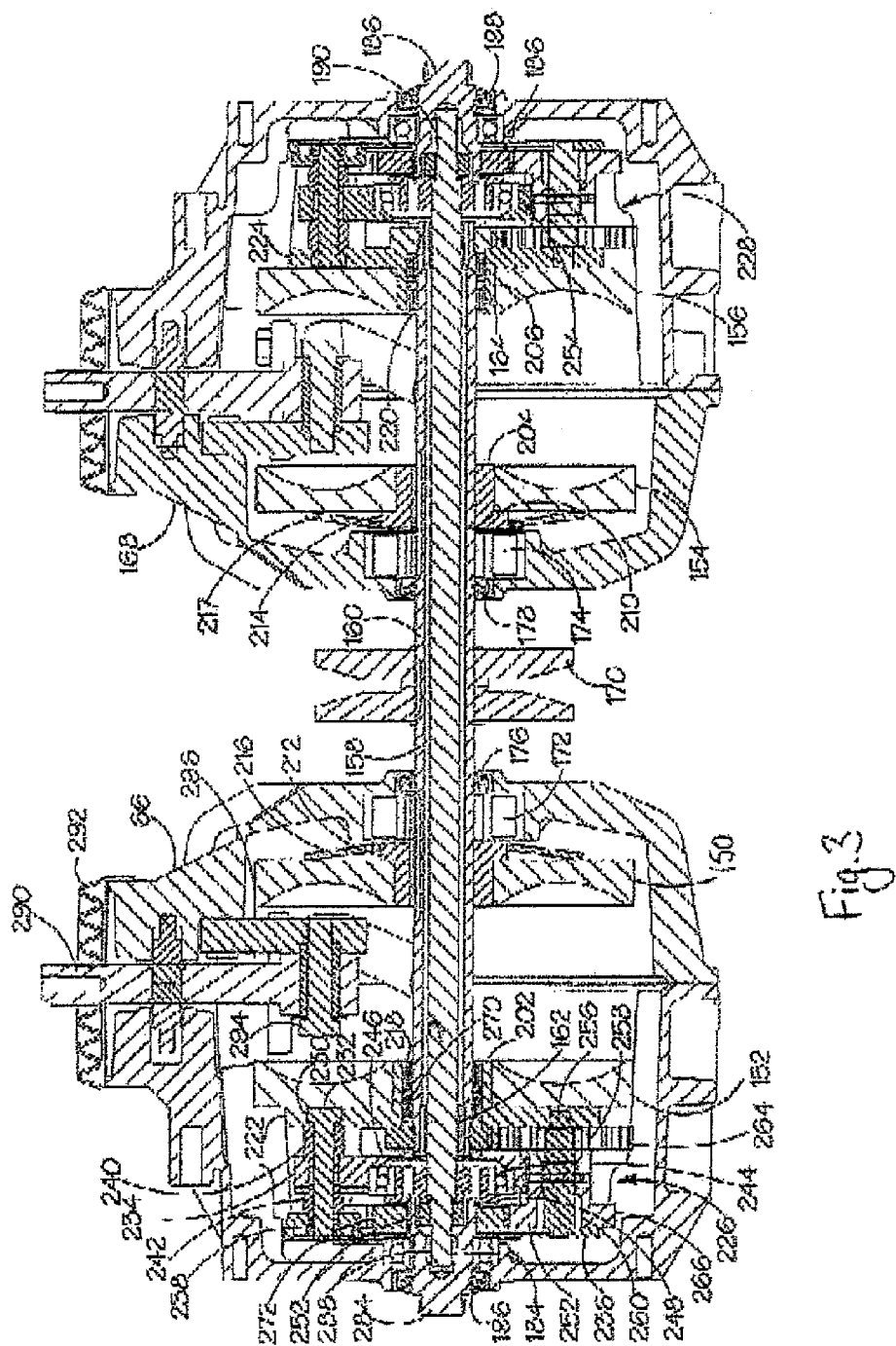
FIG. 3 is a detailed section, in an axial plane, through a twin variator arrangement according to the present invention.

Omitted from FIG. 2 are the "shunt" gear trains which make it possible to move through forward output rotation, via geared neutral, to reverse rotation, merely by adjustment of variator ratio. A practical embodiment including the shunt gear trains is illustrated in FIG. 3. Also, for the sake of clarity, the main components of one of the shunt gear trains—and of the corresponding variator—are represented in schematic form in FIG. 5. The embodiment has been designed for a low power vehicle, specifically for a ride-on lawnmower, although the invention is applicable to higher power transmissions In FIG. 3 the first and second input races are indicated at 150 and 154. The first and second output races are at 152, 156. The shaft is indicated at 158 and sleeve 160 is separated from it by bearings 162, 164. The two variators are housed in first and second housings 166, 168. In the illustrated embodiment these are part filled with oil which serves both as lubricant and as the "traction fluid" which, by forming a thin film between the rollers and the races, transmits drive from one to the other. The requirement for a traction fluid is well known and understood in the art. Mounted upon the sleeve 160 between the variator housings 166, 168 is a "V" pulley 170 which is driven from the engine by a belt (not shown). The sleeve 160 is journalled in first and second sleeve bearings 172, 174 where it enters the two housings, and seals 176, 178 resist escape of oil in these areas. End portions of the shaft 158 extend into first and second coaxial output shafts 184, 186 and receive further support in these regions from further shaft bearings 188, 190 within the respective output shafts. The output shafts 184, 186 are themselves journalled in output shaft bearings 192, 194 mounted in the respective housings 166, 168. Seals 196, 198 resist escape of oil where the output shafts 184, 186 emerge from the housings.

In the illustrated example the races 150, 152, 154, 156 are each carried upon a respective flanged, annular collar 200, 202, 204, 206 and the collars in turn are each mounted on the sleeve 160. First and second input collars 200, 204 are splined to the sleeve 160 to rotate along with it, and each is prevented from moving axially by a respective circular clip 208, 210 engaging with the sleeve 160. Flanges 212, 214 limit movement of the input races 150, 154 toward each other. Also the input collars 200, 204 each carry a respective pre-stressed conical spring 216, 217 acting on the reverse face of the respective input race 150, 154 to provide the biasing force needed to sustain roller/race traction.

First and second output collars 202, 206, carrying the first and second output races 152, 156, are mounted upon the sleeve 160 through respective collar bearings 218, 220. The output collars 202, 206 have flanges 222, 224 against which the output races abut. The variator rollers are omitted from FIG. 3.

The first and second variators have respective shunt gearing in the form of co-axial, epicyclic gear trains 226, 228 through which the output shafts 184, 186 are driven from their respective output races 152, 156. It will firstly be described how the axial forces upon the output races are referred to the shaft, and the operation of the gear trains will then be explained.

Looking at first epicyclic gear train 226, the flange 222 of the first output collar 202 has through-holes 230 which receive bolts 232, the holes being counterbored to receive the bolts' heads. Each bolt passes first through a carrier ring 234 and then through a shaped end plate 236, its outer end receiving a nut 238. Cylindrical spacers 240, 242 received upon the bolt separate the flange 222 from the carrier ring 234, and the carrier ring 234 from the end plate 236. The carrier ring 234 has a through-going opening in which is received the outer race of a thrust bearing 244, and also has an internal flange 246 which abuts against the thrust bearing to transfer axial force to it. The inner race of the thrust bearing 244 is mounted on an annular thrust ring 248, abutting against an outer flange thereof. The thrust ring 248 in turn abuts against a nut 252 screwed onto the shaft 158. Hence axial force upon the first output race 156 is referred through the flange 222, spacer 240, carrier ring 234, thrust bearing 244, thrust ring 248 and nut 252 to the shaft 158.

The second epicyclic gear train 228 is identical to the first (except for being its mirror image) and so need not be separately described.

It will be appreciated that, despite its relative complexity, the FIG. 3 arrangement corresponds to that of FIG. 2 in that the outward force upon the output races 152, 156 is referred to the shaft, which is thus in tension. Note that FIG. 3 shows a first thrust bearing 244 and also a second thrust bearing 254 (in the second variator), whereas the arrangement in FIG. 2 has only a single thrust bearing. Both embodiments have the advantages in terms of efficiency which have been described above. One or other of the thrust bearings 244, 254 of FIG. 3 could however be replaced with a plain spacer ring, to save the cost of a second thrust bearing.

Figure 5:
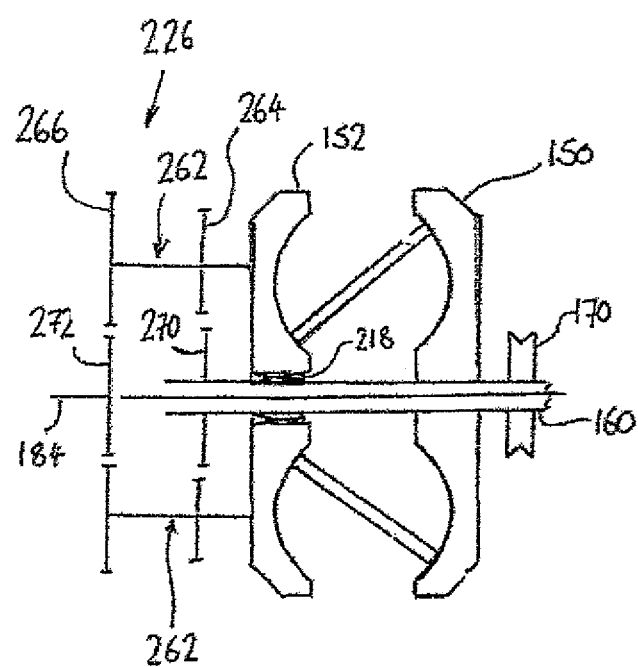
FIG. 5 is a highly schematic representation of key parts of a shunt gear train according to the present invention, and of its associated variator.

The operation of the first epicyclic gear train 226 will now be explained and in this context it will be useful for the reader to refer not only to FIG. 3, but also to FIG. 5, which shows the most relevant parts of the gear train in schematic form. Again, the second train 228 is a precise mirror image and need not be separately described. Axles 256 extend between the carrier ring 234 and the end plate 236, having reduced diameter ends received in bores in the ring and the plate. Through bearings 258, 260, each axle carries a respective planet gear 262 having first and second toothed gear heads 264, 266 separated and coupled by a narrowed region. It will be appreciated that when the first output race 152 rotates, the planet gears 262 move in a circular orbit, as in any epicyclic gear train. The first gear head 264 meshes with a sun gear 270 which is carried upon an outer end of the sleeve 160 and rotates along with it. The second gear head 266 meshes with an output gear 272 which is carried upon the first output shaft 184 and serves to drive that shaft. Final gearing (or some other form of rotary coupling) couples the output shaft 184 to driven wheels on one side of a vehicle in which the transmission is mounted.

The speed and direction in which the output gear 272/shaft 184 are driven are a function of the speeds of (i) the output race 152/carrier ring 234 and (ii) the pulley 170/sleeve 160/sun gear 270/input race 150. These two assemblies rotate in opposite directions. Their relative speeds depend upon the variator ratio. At a certain ratio, the two cancel each other out and the output shaft 184 is stationary despite rotation of the variator input—the "geared neutral" condition. Variator ratios to either side of geared neutral provide forward and reverse drive, respectively. Note that the sleeve 160, passing as it does through the output race 152, performs an important function in that it transfers drive at the speed of the input 150, 170 to the epicyclic gear train 262.

Figure 4:
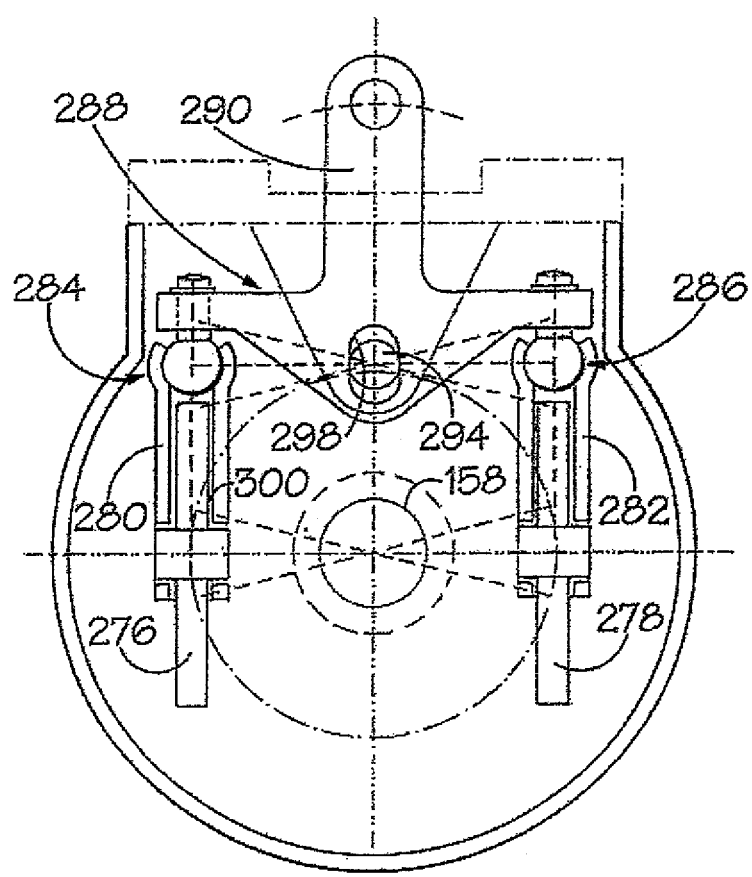
FIG. 4 is a view along an axial direction of a roller mounting arrangement of the FIG. 3 embodiment.

It has yet to be explained how the variator rollers are mounted and controlled, and for the sake of completeness this will now be done with reference to FIG. 4 as well as FIG. 4. Once more only the first variator will be described since the second is a mirror image. It has two rollers 276, 278 each rotatably journalled in a respective "U" shaped support 280, 282 having an end portion which forms one half of a ball and socket joint 284, 286. In this way the supports are coupled to respective lateral limbs of a control member 288 formed as an inverted "T" shape. The control member has an upright limb which projects out of the variator housing 166 to serve as a control lever 290. A boot 292 (FIG. 3) prevents escape of oil where it emerges form the housing. A pin 294 fixed in a mounting plate 296 (seen in FIG. 3) serves as a fulcrum for the control member, being received in a through-going slot 298 therein. The variator is controlled by means of the lever 290, moving which displaces the rollers along a circular path 300 about the axis defined by the shaft 158. As is well known in the art, the rollers seek an orientation in which their rotational axes intersect the shaft axis. Movement of the rollers along their circular path 300 tends to take the rollers away from this condition, and to maintain intersection of their axes they consequently change their orientation, producing a corresponding change in variator ratio.

The above described embodiments are presented by way of example and not limitation. Numerous variations are possible without departing from the scope of the invention as defined by the appended claims. For example all of the embodiments use a simple spring arrangement for creating the biasing force needed to sustain roller/race traction. This is appropriate in transmissions required to handle only low powers. Where higher powers are to be handled, the variators would typically have a hydraulic actuator to apply a force which is variable in accordance with the torque referred to the variator, as is well known in the art. Such hydraulic arrangements could be utilised in the present invention. Whereas a single spring acting upon one variator race is used to create the force in the embodiments of FIGS. 2 and 3, two separate biasing devices may be used for this purpose (note in this regard that the FIG. 4 embodiment has two such springs). Also numerous different types of roller mountings and roller control mechanisms are known to those skilled in the art and could be adopted. Also although the illustrated embodiments all use two components to form the variator input races, it would be possible to form both races by means of a single component, which would be toroidally recessed on both of its faces. In such an embodiment the biasing device used to create the end load could not of course be placed between the input races, but could for example be placed between the thrust bearing 100 and the output race 80, in FIG. 3.

The invention claimed is:

1. A transmission arrangement comprising two variators each of which comprises a first race, a second race, and a plurality of rollers arranged to run upon the first and second races to transfer drive from one to the other, all of the races being mounted for rotation about a common axis with the first races arranged between the second races, the inclination of one variator's rollers being variable independently of the inclination of the other variator's rollers so that the two variators provide independently and continuously variable drive ratios, the arrangement further comprising a biasing device for exerting a force upon at least one of the races to urge the races into engagement with the rollers, and a shaft, lying along the common axis, which passes through the first races and by means of which the second races are coupled, via at least one thrust bearing, to resist movement of one away from the other so that the force of the biasing device is referred through the shaft and the thrust bearing, the arrangement still further comprising two shunt gear trains which are coupled to the respective variators and are coaxial with the variator's races, each shunt gear train having a first gear operatively coupled to the first race of its associated variator, a second gear operatively coupled to the second race of its associated variator, and an output gear whose speed is a function of the speeds of the first and second gears.

2. A transmission arrangement as claimed in claim 1 in which the first race is coupled to the first gear via a coupling member which rotates about the common axis and extends through the associated second race.

3. A transmission arrangement as claimed in claim 2 in which the coupling member takes the form of a sleeve arranged around, and rotatable relative to, the shaft.

4. A transmission arrangement as claimed in claim 2 which the shunt gear trains are outboard, and on opposite sides, of the variator races.

5. A transmission arrangement as claimed in claim 4 in which the first races serve as the variator's inputs, being coupled to one another to rotate together and provided with a drive arrangement for coupling to a rotary driver.

6. A transmission arrangement as claimed in claim 1 in which the biasing device comprises a pre-stressed spring.

7. A transmission arrangement as claimed in claim 3 in which the sleeve passes through all of the variator races, projecting at either end of the variator arrangement to receive the first gears.

8. A transmission arrangement as claimed in claim 7 in which the first races are mounted upon the sleeve to rotate along with it.

9. A transmission arrangement as claimed in claim 8 in which the second races are mounted upon the sleeve through bearings to enable them to rotate independently of it.

10. A transmission arrangement as claimed in claim 3 in which the shunt gear trains are of epicyclic type, having a sun gear, a planet carrier carrying planet gears which mesh with the sun gear, and an output gear which meshes with the planet gears.

11. A transmission arrangement as claimed in claim 10 in which the planet carrier is directly coupled to an outermost face of the second race to rotate with it.

12. A transmission arrangement as claimed in claim 11 in which the sun is mounted on the aforementioned sleeve.

13. A transmission arrangement as claimed in claim 10 in which the ratios of the gear train are such that by adjustment of variator ratio it can provide forward and reverse rotation of the output shaft, and geared neutral.

14. A vehicle comprising a transmission arrangement as claimed in claim 1, one of the variators being coupled to a left hand vehicle wheel and the other of the variators being coupled to the right hand vehicle wheel, so that by adjustment of variator ratios a steering effect is exerted on the vehicle.

15. A transmission arrangement as claimed in claim 3 which the shunt gear trains are outboard, and on opposite sides, of the variator races.

16. A transmission arrangement as claimed in claim 4 in which the biasing device comprises a pre-stressed spring.

17. A transmission arrangement as claimed in claim 4 in which the sleeve passes through all of the variator races, projecting at either end of the variator arrangement to receive the first gears.

18. A transmission arrangement as claimed in claim 2 in which the shunt gear trains are of epicyclic type, having a sun gear, a planet carrier carrying planet gears which mesh with the sun gear, and an output gear which meshes with the planet gears.

19. A transmission arrangement as claimed in claim 11 in which the ratios of the gear train are such that by adjustment of variator ratio it can provide forward and reverse rotation of the output shaft, and geared neutral.

20. A vehicle comprising a transmission arrangement as claimed in claim 10, one of the variators being coupled to a left hand vehicle wheel and the other of the variators being coupled to the right hand vehicle wheel, so that by adjustment of variator ratios a steering effect is exerted on the vehicle.

* * * * *

UNITED STATES PATENT AND TRADEMARK OFFICE
CERTIFICATE OF CORRECTION

PATENT NO. : 8,500,593 B2  
APPLICATION NO. : 12/523718  
DATED : August 6, 2013  
INVENTOR(S) : Brian J. Dutson It is certified that error appears in the above-identified patent and that said Letters Patent is hereby corrected as shown below:

On the title page, Item (86) PCT No., delete "PCT/JP2008/050030" and insert --PCT/GB2008/050030-- therefor.

Signed and Sealed this  
Nineteenth Day of November, 2013

Teresa Stanek Rea  
*Deputy Director of the United States Patent and Trademark Office*